United States Patent [19]

Nomura et al.

[11] Patent Number: 4,849,953
[45] Date of Patent: Jul. 18, 1989

[54] TRACKING CIRCUIT FOR AN OPTICAL INFORMATION RECORDING AND REPRODUCING APPARATUS

[75] Inventors: Masaru Nomura, Tenri; Toshihisa Deguchi, Nara; Shigeo Terashima, Tenri, all of Japan

[73] Assignee: Sharp Kabushiki Kaisha, Osaka, Japan

[21] Appl. No.: 924,262

[22] Filed: Oct. 29, 1986

[30] Foreign Application Priority Data

Oct. 30, 1985 [JP] Japan .................. 60-245096
Oct. 31, 1985 [JP] Japan .................. 60-246497

[51] Int. Cl.$^4$ ......................................... G11B 7/126
[52] U.S. Cl. ............................................ 369/46
[58] Field of Search ............... 369/44, 45, 46, 111, 369/124, 109, 110, 32; 250/201 DF; 358/342

[56] References Cited

U.S. PATENT DOCUMENTS

| 4,502,134 | 2/1985 | Kondo et al. | 369/46 |
| 4,504,937 | 3/1985 | Yonezawa et al. | 369/46 |
| 4,564,929 | 1/1986 | Yonezawa et al. | 369/46 |
| 4,587,644 | 5/1986 | Fujiie | 369/46 |
| 4,589,103 | 5/1986 | Tajima | 369/46 |
| 4,663,751 | 5/1987 | Kaku et al. | 369/46 |

FOREIGN PATENT DOCUMENTS

| 0189932 | 1/1986 | European Pat. Off. |
| 2544535 | 4/1984 | France |
| 60-52935 | 3/1985 | Japan |
| 60-61925 | 4/1985 | Japan |
| 2141266 | 4/1984 | United Kingdom |

Primary Examiner—Donald McElheny, Jr.
Attorney, Agent, or Firm—Birch, Stewart, Kolasch & Birch

[57] ABSTRACT

An optical information recording and reproducing apparatus comprising: a circuit for focusing a light beam on a recording track of an optical disk having tracks formed spirally or concentrically; a circuit for recording the information on a track corresponding to the focused position of light beam on the track or reproducing information from on the track; a tracking control circuit for generating a tracking control signal for matching the focused position of the light beam with the track; a circuit for detecting deviation of the focused position of the light beam from the track and generating a deviation signal corresponding to the focused position of the light beam; a holding circuit for holding the deviation signal; a subtracting circuit for subtracting the held deviation signal from the tracking control signal; and a circuit for moving an objective lens for controlling the focused position of the light beam in response the output signal from the subtracting circuit.

9 Claims, 7 Drawing Sheets

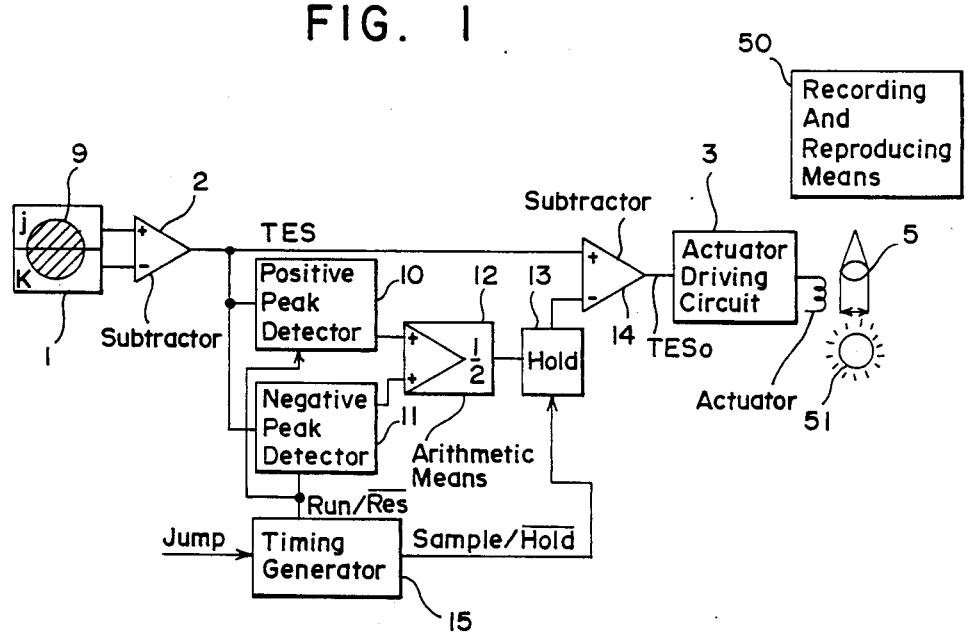
FIG. 1
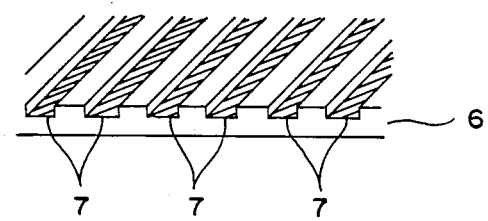
FIG. 2
CONVENTIONAL ART
FIG. 3
CONVENTIONAL ART

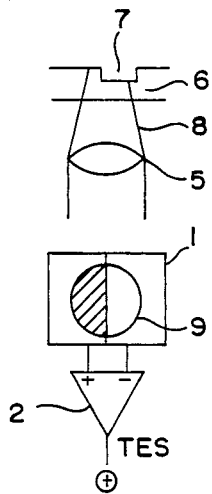
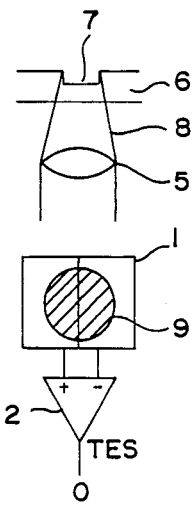
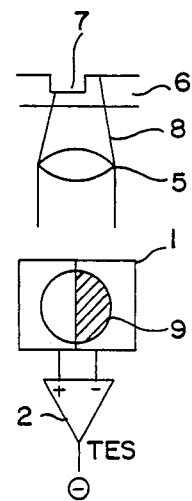
FIG. 4(a)
CONVENTIONAL ART
FIG. 4(b)
CONVENTIONAL ART
FIG. 4(c)
CONVENTIONAL ART
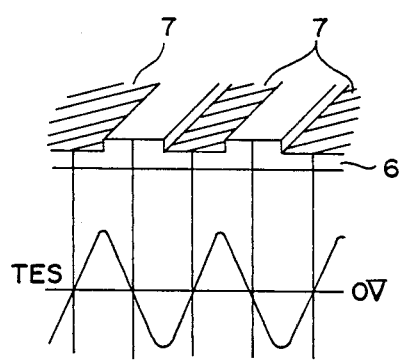
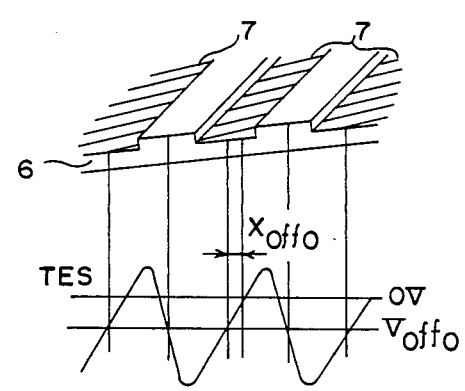
FIG. 5(a)
CONVENTIONAL ART
FIG. 5(b)
CONVENTIONAL ART

TRACKING CIRCUIT FOR AN OPTICAL INFORMATION RECORDING AND REPRODUCING APPARATUS

BACKGROUND OF THE INVENTION

This invention relates to an optical information recording and reproducing apparatus.

Conventionally, an optical information recording and reproducing apparatus, using an optical disk on which tracks are formed spirally or concentrically, used a method of focusing a light beam from a light source such as a laser onto a track by means of an optical pickup device in order to record information on the tracks and to reproduce the recorded information. When using a recording and reproducing apparatus, the focusing of the light beam spot correctly on a desired track was performed by using a focusing control to move the focus of the light beam and a tracking control to match the focused position of the light beam with the track. If the surface of the optical disk was inclined or warped, or if the adjustment of the optical system of optical pickup device deviated, an offset appeared in the tracking control signal causing the tracking to operate unsatisfactorily. This problem is clearly described below using FIG. 2 through FIG. 7.

FIG. 2 is a simplified block diagram of a tracking servo system for tracking control. A photo detector for tracking control 1 detects the deviation of the light beam in the tracking direction. In this example, the circuit is divided into two parts. a subtractor 2 determines the difference of the output of this photo detector 1. An actuator driving circuit 3 comprising a phase compensation circuit and others drives an actuator 4. The actuator 4 shifts an objective lens 5 in the tracking direction. The output of the subtractor 2 is called a tracking control signal TES. On the optical disk, as mentioned above, tracks 7 are formed spirally or concentrically, as shown in FIG. 3, in order to record information on the optical disk 6.

FIGS. 4(a–c) are a schematic representation of the changes in the quantity of light incident upon the photo detector based on the relation between the focused position of light beam and the track position.

A light beam 8 is focused by the objective lens 5 onto the track 7 of optical disk 6 and is reflected and diffracted back to the photo detector of tracking control 1, appearing as the quantity of light 9 received on the photodetector. The hatching in FIGS. 4(a) and 4(c) schematically shows the larger quantity of light. Depending on the focused position of light beam 8 and the position of the track 7, the quantity of light 9 received on the photodetector 1 varies which in turn causes the output of the subtractor 2 (tracking control signal TES) to vary positively or negatively.

The quantity of light received at the photodetector for tracking control 1 changes as shown in FIGS. 4(a–c) depending on the relative positions of the light beam focused position and track. When the output difference of the elements of the photodetector 1 (two elements are shown in this example) is obtained from the subtractor 2, a track control signal TES varying positively or negatively depending on the relative positions is obtained.

A positive change is shown in FIG. 4(a), and a negative change is demonstrated in 4(c), while 4(b) denotes a case of exact tracking of light beam on the track, causing the tracking control signal TES to be zero.

Usually, the tracking control system controls the focused light beam position so that the TES is zero near the middle of a track causing the light beam to be correctly positioned on the track.

When a light beam vertically enters the disk surface without inclination, according to the changes in the relative positions of track 7 and light beam 8, a tracking control signal TES of an approximately sinusoidal waveform and adjusted to 0 V when the focused light beam is in the middle of a track and at the intermediate part of tracks will be obtained as shown in FIG. 5(a). The tracking servo system controls the light beam position so that this tracking control signal TES is zero near the middle of a track, so that the light beam will be focused at the middle of a track. If, however, the light beam is not emitted vertically onto the disk surface due to inclination or warp of the disk, the tracking control signal will not be 0 V when the focused light beam is in the middle of the track as shown in FIG. 5(b) causing an offset of $Voff_0$ to occur as a result. Accordingly, the light beam is focused at a position off from the middle of the track by the portion of $Xoff_0$.

If the adjustment deviates in the optical system of optical pickup device, a similar phenomenon occurs. FIG. 6 shows a properly adjusted optical system where the center of the light beam 8 coincides with the middle of the track 7, and the quantity of light received 9 is equally divided on elements j and k of the photodetector 1, so that the tracking control signal TES, the output of the subtractor 2, is zero. As stated above, since the servo system is to control the focused light beam position by making the tracking control signal TES zero, the light beam is correctly controlled to be positioned in the middle of the track in this case. When the adjustment of the optical system deviates, as shown in FIG. 7(a), and the light beam is correctly converged on the middle of the track, an offset of $Voff_1$ occurs in the tracking control signal TES. In response to this offset, the servo system operates in such a manner to produce a tracking control signal TES of zero. This causes the center of the light beam to be focused on a position off from the middle of the track, $Xoff_1$. Thus, when the center of the light beam is focused off the middle of the track, the information cannot be recorded or reproduced correctly. Moreover, if there is material that is different optically or physically, in one or more positions than in other parts on the track (for example, a disk having sector number or other information formed in a shape different from others in part of the track on which the track number is formed as pits), an abnormal voltage spike appears in the tracking control signal TES when the light beam comes to the boundary of these two parts or when going out of this boundary, due to the difference in optical or physical properties between these two parts causing unstable tracking control or other inconveniences (see FIG. 12).

SUMMARY OF THE INVENTION

Accordingly, it is a primary objective of this invention to present a novel optical information recording and reproducing apparatus capable of controlling the tracking easily and securely by always correcting the focused light beam position on a desired track, regardless of the changes in the state of disk or light beam due to displacement or disturbance in scanning.

It is another objective of this invention to present a novel optical information recording and reproducing apparatus capable of controlling the tracking easily and securely by always correcting the focused light beam position on a desired track, regardless of changes in the state of disk and light beam due to displacement of disturbance in scanning or presence of dissimilar parts on the track.

Other objectives and further scope of applicability of the present invention will become apparent from the detailed description given below. It should be understood, however, that the detailed description and specific examples, while indicating preferred embodiments of the invention, are given by way of illustration only. Various changes and modifications within the spirit and scope of the invention will become apparent to those skilled in the art from this detailed description.

To achieve the above objectives, according to one embodiment of the present invention, an optical information recording and reproducing apparatus comprises means for focusing a light beam on a recording track of an optical disk in which tracks are formed spirally or concentrically, means for recording the information on the track corresponding to the focused position of the light beam on said track or for reproducing the information from on the track, tracking control means for generating a tracking control signal representing the matching of the focused position of light beam with the track, means for detecting a focusing position deviation signal of light beam generated, the tracking control means depending on the focused position of said light beam, holding means for holding said focusing position deviation signal, subtracting means for subtracting said focusing position deviation signal from the tracking control signal, and means for moving the light beam to control the focused position of said light beam according to the output signal from said subtracting means.

To achieve the above objectives, according to another embodiment of the present invention, an optical information recording and reproducing apparatus for recording the information by focusing a light beam on a recording track of an optical disk in which tracks are formed spirally or concentrically or for reproducing the recorded information comprises optical beam driving means for jumping between tracks for the purpose of still operation or the like on a specific track, detecting means for detecting an offset voltage appearing in the tracking control signal during the jumping between tracks, holding means for holding said offset voltage, subtracting means for subtracting said held offset voltage from the tracking control signal during recording or reproducing of information, and servo system drive means for controlling the position of said light beam by the output signal from said subtracting means.

The detecting means for detecting the offset voltage possesses a detecting means for detecting positive and negative peak voltages in the tracking control signal during the jumping period between tracks according to the control signal from a timing generating means. The timing generating means generates a control signal when the jumping period is detected. The detecting means also includes an output means for delivering a voltage of ½ of the algebraic sum of the positive and negative peak voltages which are the outputs of this detecting means.

To achieve the above objectives, according to still another embodiment of the present invention, an optical information recording and reproducing apparatus for recording information on a track or reproducing a previously recorded information, by focusing a light beam on a track of an optical disk where the tracks are formed spirally or concentrically and information is recorded on parts of said tracks in a different shape or nature than on other parts, comprises detecting means for detecting the period between the light beam entering said different part on the track and going out of this part, or before and after, detecting means for detecting the peak value of a spike-shaped voltage occurring in the tracking control signal when the beam comes to the boundary between said different part and other part, holding means for holding said voltage peak value, arithmetic means for multiplying the held voltage peak value by a coefficient, correction operating means for correcting and operating upon said coefficient-multiplied peak value from the tracking control signal during recording or reproducing of information, and servo system driving means for controlling the focused position of said light beam in response to the control signal from the correction operating means.

The detecting means for detecting the peak value of spike-shaped voltage detects said spike voltage peak value, together with its polarity, only during the period detected above by means of a control signal from the means to detect said period.

The holding means for holding the voltage peak value holds said voltage peak value in response to the control signal from the detecting means for detecting said period, and updates this held peak value every detected period.

BRIEF DESCRIPTION OF THE DRAWINGS

The present invention will become more fully understood from the detailed description given below and the accompanying drawings which are given by way of illustration, and thus are not limitative of the present invention and wherein:

FIG. 1 is a circuit block diagram of a first embodiment of an optical information recording and reproducing apparatus according to the present invention;

FIG. 2 is a schematic block diagram of a conventional tracking servo system;

FIG. 3 is a drawing showing a conventional optical disk;

FIGS. 4(a-c) are drawings showing the principle of tracking control;

FIGS. 5(a & b) are drawings showing that an inclination of disk gives rise to tracking control failure;

DETAILED DESCRIPTION OF THE INVENTION

One embodiment of an optical information recording and reproducing apparatus of this invention is described below. Using a disk having spiral or concentrical tracks, the controlling of the light beam in the central direction of the disk is accomplished by detecting the offset voltage of the tracking control signal, and by removing this offset voltage from the tracking control signal. Thus, convergence of the light beam to the center of the track is ensured.

Figure 6:
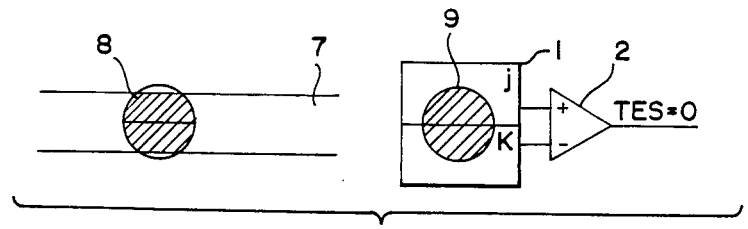
FIG. 6 and FIGS. 7(a & b) are drawings showing that a deviated adjustment in the optical system gives rise to a tracking control failure.
Figure 7A:
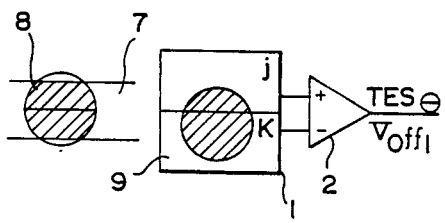
Figure 7B:
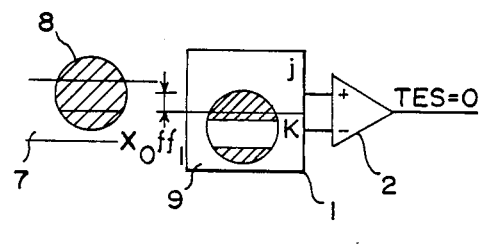
Figure 8:
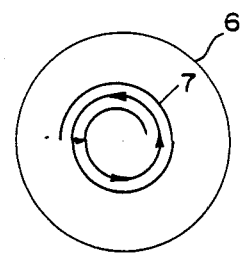
FIG. 8 is a drawing showing the route of a light beam on a disk having spiral tracks in still operation.
Figure 9:
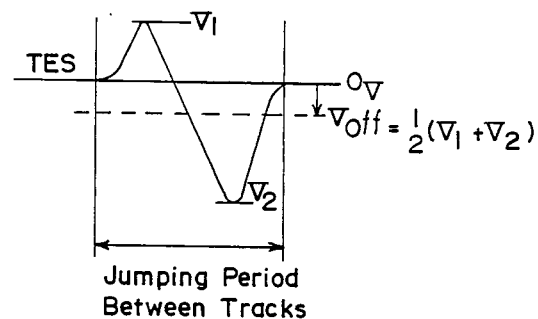
FIG. 9 is a signal waveform diagram showing the waveform of the tracking control signal TES when jumping tracks.

The optical information recording and reproducing apparatus of this embodiment of the present invention operates on the following principle. When recording or reproducing the information in a disk having spiral or concentrical tracks, for example, tracks may be jumped for the still operation (stopping at the same track) or for accessing to a desired track (see FIG. 8). During this jumping, the tracking control signal TES as shown in FIG. 9, is ½ of the algebraic sum of the positive peak voltage $V_1$ and negative peak voltage $V_2$ causing an offset voltage Voff of TES.

Figure 11:
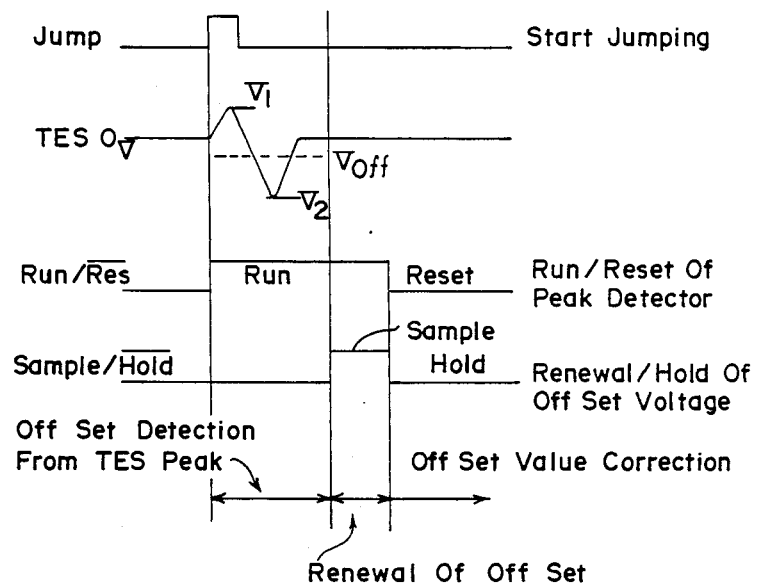
FIG. 11 is a timing waveform diagram of operation of individual parts.
Figure 12:
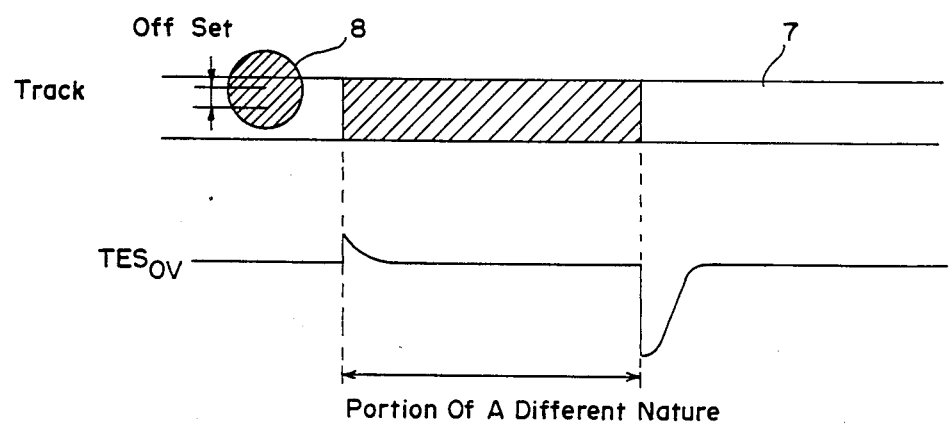
FIG. 12 is a waveform diagram showing the tracking control signal in abnormal state.

A first embodiment of the optical information recording and reproducing apparatus of this invention according to this principle of operation is shown in FIG. 1. By finding the difference of the outputs of elements j and k of a photodetector of a tracking control 1 using a subtractor 2, a tracking control signal TES is generated. Peak voltage detecting circuits 10 and 11 respectively detect the positive and negative peak voltage of tracking control signal TES. An adder and multiplier, or arithmetic means, or weighing means 12 determines ½ of the algebraic sum of the positive and negative peak voltages. In consequence, the offset voltage Voff of said tracking control signal TES is detected. A holding circuit 13 holds this offset voltage Voff. A subtractor 14 subtracts this held offset voltage from the original tracking control signal TES, and generates an output $TES_0$ as a result. A timing generating circuit 15 generates a timing control signal during jumping of the tracks (when a jump signal is generated), for the peak voltage detecting circuits 10, 11, and offset voltage holding circuit 13. The signal waveforms of the various elements are shown in FIG. 11. Using the output $TES_0$ of the subtractor 14, the actuator 4 is driven through a driving circuit 3, thereby shifting the objective lens 5 to cause the light beam to correctly and accurately focus in the middle of a track. This process and apparatus alleviates the above-discussed inconveniences. Also, the offset voltage holding circuit 13 updates the offset voltage being held during the jumping of the tracks.

Figure 10:
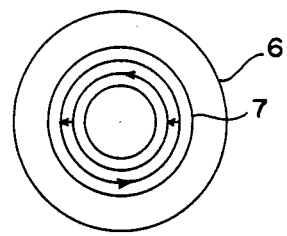
FIG. 10 is a drawing showing the route of a light beam on a desired track in a disk having concentric tracks.

According to this embodiment of the present invention, since the offset of the track for recording or reproducing of the information is actually corrected on every occasion of track jumping, the light beam can be accurately focused on the track, regardless of warp or inclination of the disk in the radial direction or time-wise deviation of the adjustment of the optical system without large overshoot. In a disk having concentrical tracks, for example, when the information is recording or reproduced between adjacent tracks as shown in FIG. 10, jumping is effected when moving to any track, and thus, the offset correction may be done optimally at every track. Therefore, the above advantages of this invention are not changed at all. Of course, it is not necessary to correct at every track jump, and it may be corrected only when necessary.

A second embodiment of an optical information recording and reproducing apparatus of this invention is described below.

In the first embodiment, the convergence of the light beam into the middle of the track at the time of controlling the light beam in the central direction of the disk is controlled by eliminating the offset voltage occurring in the tracking control signal. In the second embodiment, on the other hand, when the light beam is focused off the middle of the track while scanning on the track, an offset voltage is caused in the tracking control signal. While the optical beam is scanning and when moving from a first position on the track to a second position which is dissimilar from the first position, a spike-shaped voltage occurs in the tracking control signal having an offset voltage. This spike-shaped voltage varies depending on the magnitude of the offset voltage, so that when the tracking control signal is controlled by detecting the spike-shaped voltage, the light beam is accurately converged to the middle of the track. This second embodiment is based on the following concept.

The above-discussed conventional problem occurs because the light beam is focused off the middle of the track and will not occur when focused correctly on the middle of the track. Furthermore, when the light beam comes to the boundary between different parts (such as track number etched on the track), the deviation is representative in the spike-shaped voltage occurring in the tracking control signal TES, so that by detecting this spike-shaped voltage, the individual track may be optimally corrected.

Figure 13A:
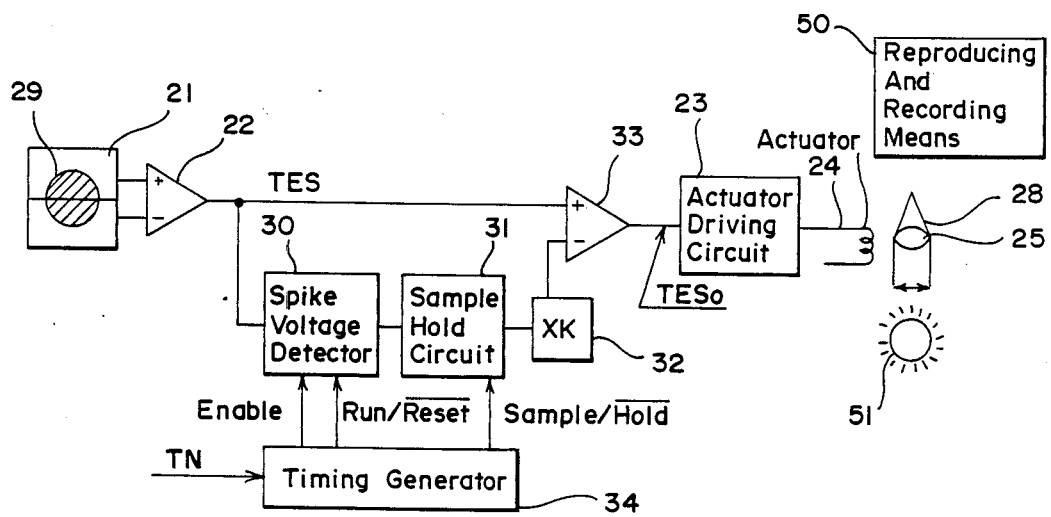
FIG. 13(a) is a circuit block diagram of a second embodiment of an optical information recording and reproducing apparatus according to the present invention.
Figure 13B:
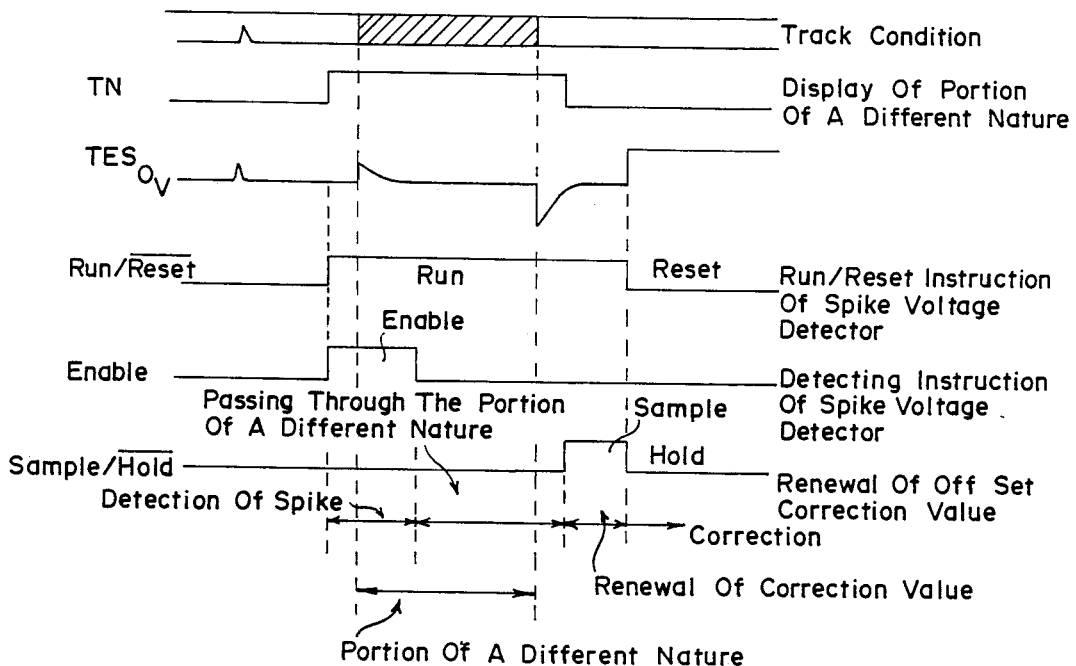
FIG. 13(b) is a timing waveform diagram.

In the circuit block diagram of FIG. 13(a), the difference in the quantity of light received 29 by two elements which make up a photodetector 21 is determined by a subtractor 22 and becomes a tracking control signal TES. A spike-shaped voltage detector 30 detects the spike-shaped voltage in this tracking control signal TES. A sample hold circuit 31 holds the output of this detector 30. A timing signal generating circuit 34 generates control signals for said spike-shaped voltage detector 30 and sample hold circuit 31, in response to the control signal TN from means (not shown) for detecting when the light beam comes to this different part on the track or leaves this part. The voltage for offset correction is updated whenever this control signal TN is generated. A coefficient multiplier 32 multiplies the output of the sample hold circuit by a coefficient Numeral 33 denotes a subtractor in this embodiment, which generates a corrected tracking control signal $TES_0$ by subtracting the output of this coefficient multiplier from the tracking control signal TES. This corrected tracking control signal $TES_0$ drives the actuator 24 through an actuator driving circuit 23 comprising phase compensating circuit and others, thereby shifting the objective lens 25 to control the focusing position of light beam 28. This embodiment is suited when the position of a different part (the track number or the like in this explanation) formed by etching on the disk can be easily estimated relatively. The operational timing of this embodiment is shown in FIG. 13(b). By limiting the action of the spike voltage detector 30 and sample hold circuit 31 only to when different parts are detected, according to the control signal from the timing generating circuit 34, the apparatus avoids detecting, by mistake, the spike voltage caused by a flaw on the track (located at the left side of the different part in (b) of FIG. 13). A third embodiment of this invention is shown in FIGS. 14(a) & (b).

Figure 14:
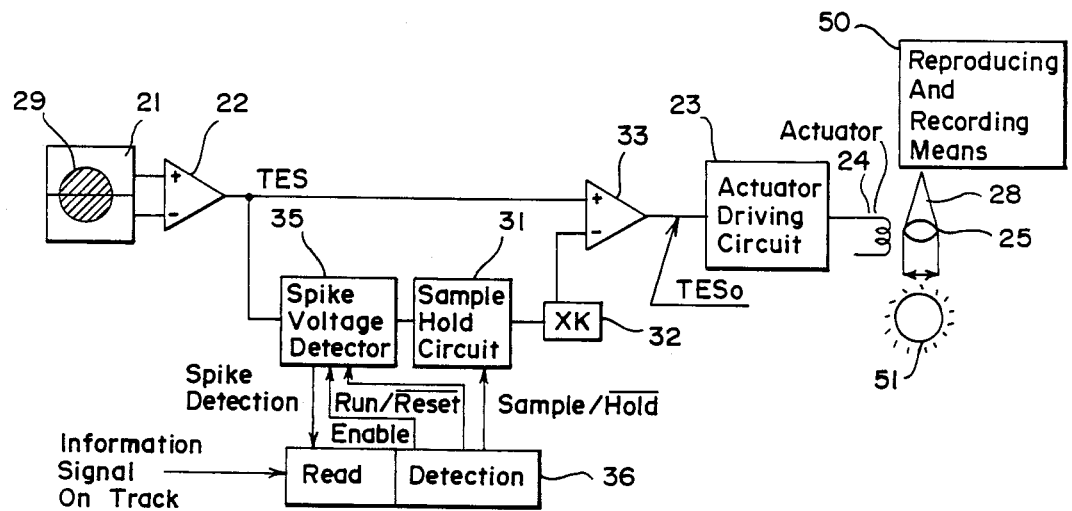
FIG. 14(a) is a circuit block diagram of a third embodiment of an optical information recording and reproducing apparatus according to the present invention.
FIG. 14(b) is a timing waveform diagram.
Figure 14:
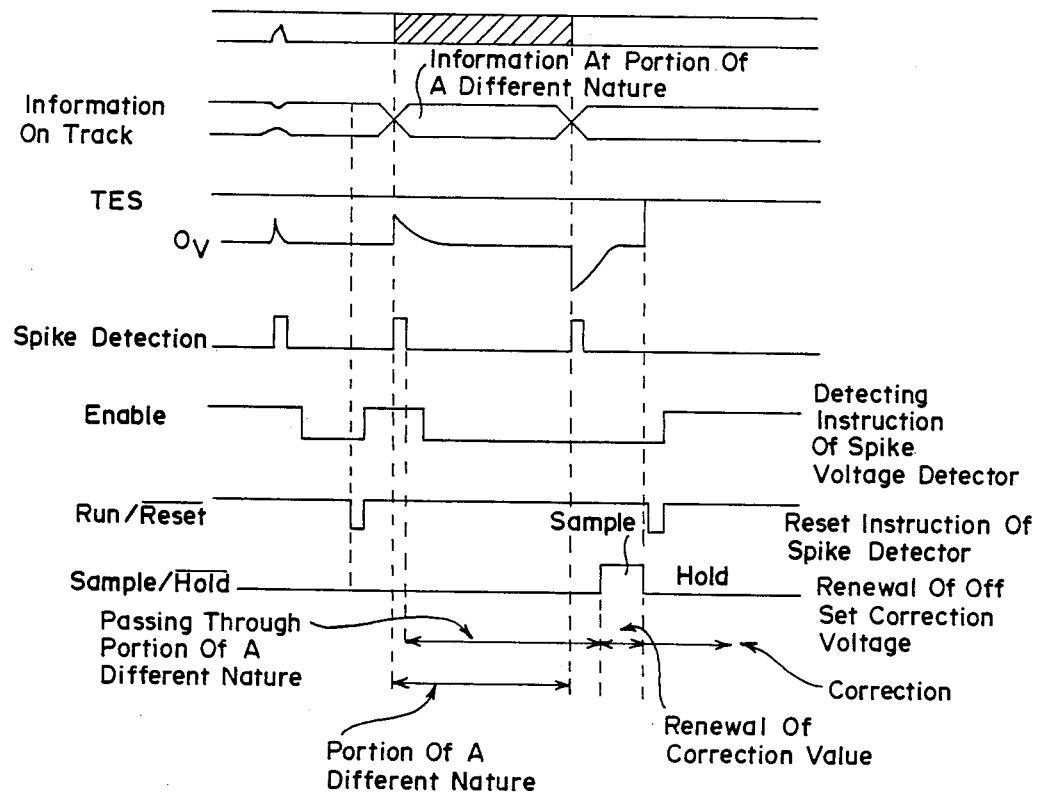

The circuit block diagram is shown in FIG. 14(a). It is approximately same as FIG. 13, except that the spike voltage detector 35 is different from that in FIGS. 13(a) & (b). It detects the peak value when a spike voltage occurs on the tracking control signal TES, and also produces a control output signal for noticing the occurrence of spike voltage for the timing generating circuit 36. The timing generating circuit 36 is also different. It reads the information from the track after occurrence of said control output signal, and sends a direction to the sample hold circuit 31 when it is judged that the information is from the dissimilar art on the track, and updates the voltage for correction. This embodiment is suited when it is hard to easily estimate the position of dissimilar parts on the track, such as the track number in a CL V (constant linear velocity) disk or the recorded area of addition write-in type disk. In this embodiment, the timing is as shown in FIG. 14(b).

In the above embodiments, spike voltages occur when the light beam comes to the dissimilar part and leaves that area. Either moment or both moments may be detected, but the former moment is advantageous because the quantity of positional deviation between the light beam focusing position and the middle of track is expressed accurately. In the embodiment of FIGS. 14(a) & (b), in particular, when the latter moment is detected, it is necessary to always read the information on the track and to detect the spike voltage which is generated after it is judged that is is a dissimilar part, so that the structure is rather complicated.

In the second and third embodiments of this invention, since the offset is corrected for a desired track, the optimum tracking control on individual tracks may be effected, and if dissimilar parts are present on the track, the effect on the tracking control system in that area can be eliminated.

While only certain embodiments of the present invention have been described, it will be apparent to those skilled in the art that various changes and modifications may be made therein without departing from the spirit and scope of the present invention as claimed.

What is claimed is:

1. An optical information recording and reproducing apparatus comprising:
   light means for supplying a focused light beam with a desired position on a track of an optical disk, said optical disk having tracks formed spirally or concentrically;
   recording and reproducing means for recording information on a selected track which receives said focused light beam or for reproducing the information from on said selected track;
   tracking control means for generating a tracking control signal, said tracking control signal representing the position of said focused light beam with respect to said selected track;
   position detection means for detecting a deviation of the position of said focused light beam from said selected track and for generating a deviation signal representing said deviation;
   holding means, operatively connected to said position detection means, for holding said deviation signal;
   subtracting means, operatively connected to said holding means and said tracking control means, for producing a corrected tracking control signal by subtracting said deviation signal from said tracking control signal; and
   moving means, operatively connected to said subtraction means and responsive to said corrected tracking control signal, for moving said light means, thereby controlling the position of said focused light beam in response to said corrected tracking control signal from said subtracting means.

2. An optical information recording and reproducing apparatus for recording information or reproducing recorded which tracks information by focusing a light beam, having a certain position, on a recording track of an optical disk, the optical disk having tracks which are spirally or concentrically formed, comprising:
   light beam driving means for jumping between tracks during an operation, said operation including a still operation which requires track jumping, on a specific track and for producing a jump control signal during a period of jumping;
   tracking control means for generating a tracking control signal, said tracking control signal representing a position of the focused light beam with respect to a desired track on the optical disk;
   detecting means, operatively connected to said tracking control means, for detecting an offset voltage appearing in said tracking control signal when jumping between tracks and for producing an offset voltage signal representing said detected offset voltage;
   holding means, operatively connected to said detecting means, for holding said offset voltage signal;
   subtracting means, operatively connected to said tracking control means and said holding means, for producing a corrected tracking control signal by subtracting the held offset voltage signal from said tracking control signal during recording or reproducing of information; and
   servo system drive means, responsive to said corrected tracking signal, for changing the portion of the focused light beam in response to said corrected tracking control signal from said subtracting means.

3. The optical information recording and reproducing apparatus as claimed in claim 2, wherein said detecting means comprises:
   peak detecting means for detecting positive and negative peak voltages in said tracking control signal;
   timing generating means for generating a timing control signal in response to said jump control signal from said light beam driving means; and
   output means, operatively connected to said peak detecting means, for producing a voltage ½ of an algebraic sum of the positive and negative peak voltages, said voltage ½ of said algebraic sum of said positive and negative peak voltages being said offset voltage signal;
   said peak determining means only operating when said timing control signal is present.

4. An optical information recording and reproducing apparatus for recording information on a track or reproducing pre-recorded information, which tracks by focusing a light beam having a desired position on the track on an optical disk, the optical disk having tracks formed spirally or concentrically, and each track having a portion with a different physical shape or nature from other portions of the track, comprising:

detecting means for detecting a, first instance in time when the light beam comes to the portion containing the different physical shape or nature and a second instance in time when the light beam leaves this portion containing the different physical shape or nature;

tracking control means, for generating a tracking control signal, said tracking control signal representing a position of the focused light beam with respect to a desired track;

peak detecting means for detecting a peak voltage of a spike-shaped voltage signal occurring in said tracking control signal when the focused light beam comes to a boundary between said portion containing the different physical shape or nature and said other portions and for producing a voltage peak value signal representing said peak voltage of said spike-shaped voltage signal;

holding means, operatively connected to said peak detecting means, for holding said voltage peak value signal;

arithmetic means, operatively connected to said holding means, for multiplying the held voltage peak value signal by a coefficient and for producing a coefficient-multiplied peak value signal;

correction operation means, operatively connected to said arithmetic means and said tracking control means, for producing a corrected tracking control signal in response to said coefficient-multiplied peak signal during recording or reproducing of information; and servo system drive means, operatively connected to said correction operating means, for controlling the position of the focused light beam in response to the corrected tracking control signal from said correction operating means.

5. The optical information recording and reproducing apparatus as claimed in claim 4, wherein said peak detecting means further detects plus and minus signs of said peak value of said spike-shaped voltage signal.

6. The optical information recording and reproducing apparatus as claimed in claim 4, wherein said detecting means produces a control signal during a time period between the detecting of said first instance in time and the detecting of said second instance in time and said holding means only operating when said control signal is present thereby updating the voltage peak value signal during every time period.

7. The optical information recording and reproducing apparatus as claimed in claim 5, wherein said detecting means produces a control signal during a time period between the detecting of said first intance in time and the detecting of said second instance in time and said peak detecting means only operate when said control signal is present.

8. A tracking device for use with an optical disk having tracks comprising:

light means, for supplying a focused light beam onto a selected track of the optical disk;

drive means, operatively connected to said light means, for moving the position of said light beam on the optical disk;

tracking means, operatively connected to said drive means, for detecting a difference between the position of said light beam and said selected track and for producing a tracking signal representing said difference; and tracking signal correcting means, operatively connected to said tracking means and said drive means, for correcting the tracking signal being applied to said drive means, thereby controlling the response of said drive means to said tracking control and enabling a proper tracking operation;

said tracking signal correcting means including, peak detecting means, operatively connected to aid tracking means, for detecting positive and negative peak voltage values in said tracking signal, weighing means, operatively connected to said peak detecting means, for summing said positive and negative peak voltage values and multiplying the sum by ½, thereby producing a weighted control signal, and subtracting means, operatively connected to said weighing means, said tracking means and said drive means, for producing a corrected tracking signal by subtracting said weighted control signal from said tracking signal and for providing said drive means with said corrected tracking signal.

9. A method for tracking a track formed on an optical disk comprising the steps of:

supplying a focused light beam having a position onto a selected track of the optical disk;

detecting a difference between the position of the light beam and the selected track;

producing a tracking signal represeenting the difference between the position of the light beam and the selected track;

moving the light beam in response to the tracking signal; and inhibiting a possible deviation in said moving step by correcting the tracking signal;

said inhibiting step including, detecting positive and negative peak voltage values in the tracking signal, summing the positive and negative peak voltage values and creating a sum, multiplying the sum by a weight coefficient to create a weighted signal, and substracting the weighted signal from the tracking signal to produce a corrected tracking signal.

* * * * *